June 21, 1966 G. EGGSTEIN 3,256,959
SPOT TYPE DISK BRAKE
Filed Feb. 26, 1964 4 Sheets-Sheet 1

INVENTOR:
GIORGIO EGGSTEIN
BY
Michael J. Striker
his ATTORNEY

June 21, 1966  G. EGGSTEIN  3,256,959
SPOT TYPE DISK BRAKE
Filed Feb. 26, 1964  4 Sheets-Sheet 2

INVENTOR:
GIORGIO EGGSTEIN
BY
Michael J. Striker
his ATTORNEY

June 21, 1966  G. EGGSTEIN  3,256,959
SPOT TYPE DISK BRAKE
Filed Feb. 26, 1964  4 Sheets-Sheet 3

INVENTOR:
GIORGIO EGGSTEIN

BY

Michael J. Striker
his ATTORNEY

June 21, 1966  G. EGGSTEIN  3,256,959
SPOT TYPE DISK BRAKE
Filed Feb. 26, 1964  4 Sheets-Sheet 4

INVENTOR:
GIORGIO EGGSTEIN
BY
Michael J. Striker
his ATTORNEY

United States Patent Office 3,256,959
Patented June 21, 1966

3,256,959
SPOT TYPE DISK BRAKE
Giorgio Eggstein, Torino, Italy, assignor to Ernst Heinkel Aktiengesellschaft, Stuttgart-Zuffenhausen, Germany
Filed Feb. 26, 1964, Ser. No. 347,563
Claims priority, application Italy, Feb. 27, 1963, 4,251/63; Germany, Apr. 13, 1963, H 48,842; Apr. 16, 1963, H 48,854, H 48,857
3 Claims. (Cl. 188—73)

The present invention relates to disk brakes in general, and more particularly to improvements in a hydraulic disk brake of the type wherein a substantially channel-shaped carrier accommodates two brake shoes which may be moved in frictional engagement with the side faces of a disk-shaped rotor. In such disk brakes, at least one of the brake shoes is movable with reference to the carrier and the carrier is movable in the axial direction of the rotor to move the other brake shoe in frictional engagement with the respective side face.

Many disk brakes of this general character are known in the art. They are often utilized in automotive vehicles to arrest a disk-shaped rotor which is connected with a wheel, and the braking force is furnished to braking shoes by one or more pistons which are movable by hydraulic fluid. A serious drawback of conventional hydraulic disk brakes is that many of them are too bulky, that they convey too much heat energy to such parts of the braking mechanism which are sensitive to heat, and that certain parts extend too far beyond the rotor.

Accordingly, it is an important object of the present invention to provide a very simple, compact, lightweight and very sturdy disk brake which may be utilized in many types of automotive vehicles, which is constructed and assembled in such a way that heat generated in response to frictional engagement between the brake shoes and the rotor may be led away by currents of air which develop when the vehicle is in motion, wherein the carrier for the brake shoes must extend only slightly beyond the periphery of the rotor, and wherein the carrier conceals a small portion of the rotor so that the major part of the rotor (as a rule between 80–90 percent) may be exposed to wind to effect rapid cooling when the brake is in actual use.

Another object of the invention is to provide an improved suspending device for anchoring the brake shoes in the carrier and to provide an improved piston which may be utilized with particular advantage in a disk brake of the above outlined characteristics.

A further object of the invention is to provide a novel coupling device for securing the carrier and the brake cylinder housing to the stator of a disk brake and to provide an improved sturdy connection between the carrier and the brake cylinder housing.

Still another object of the invention is to provide a hydraulic disk brake which is constructed and assembled in such a way that each piston is automatically exposed to currents of cooling air when the operator decides to apply the brake so that each piston is cooled very rapidly and conveys little heat energy to the cylinder housing.

A concomitant object of the instant invention is to provide a hydraulic disk brake which can be readily taken apart, wherein a defective brake shoe may be replaced with little loss in time and without necessitating complete dismantling of the remaining parts, wherein a single suspending device may serve to anchor both brake shoes in the carrier, and wherein the brake cylinder housing is automatically held against uncontrolled movement with reference to the stator.

With the above objects in view, one feature of my invention resides in the provision of a hydraulic disk brake which comprises a stator arranged to be connected to a stationary part of a vehicle, a disk-shaped rotor which is adjacent to the stator and which is fixed to a wheel or to another revolving part of the vehicle, a substantially channel-shaped carrier including a pair of side walls each of which is adjacent to but spaced from one side face of the rotor and a comparatively thin web which is rigid with the side walls and is adjacent to but extends only slightly beyond the periphery of the rotor, a brake cylinder housing which is rigid with the carrier and is preferably secured to one of the side walls by means of threaded bolts or by other suitable fasteners, and coupling means including at least two elongated bolts, dovetailed tenons or the like which serve to connect the brake cylinder housing with the stator for reciprocatory movement in the axial direction of the rotor. The coupling members are preferably arranged in such a way that their axes or longitudinal extensions are parallel with the axis of the rotor and that each thereof is at least slightly spaced from the carrier.

As a rule, the carrier will conceal a very small portion of the rotor, for example, between 10–20 percent, so that the remainder of the rotor may be cooled by wind when the vehicle is in motion and when the operator decides to apply the brake. Also, the one side wall of the carrier is preferably connected to and received between two spaced body portions disposed at the ends of the brake cylinder housing, as seen in the circumferential direction of the rotor, and the housing is provided with one or more cylinder chambers communicating with holes machined in the one side wall to accommodate pistons which are adapted to shift a brake segment in frictional engagement with one side face of the rotor and to cause shifting of the entire brake cylinder housing with reference to the stator in order to move the other brake shoe in frictional engagement with the other side face of the rotor.

The novel features which are considered as characteristic of the invention are set forth in particular in the appended claims. The improved disk brake itself, however, both as to its construction and its mode of operation, together with additional features and advantages thereof, will be best understood upon perusal of the following detailed description of certain specific embodiments with reference to the accompanying drawings, in which:

Figure 1:
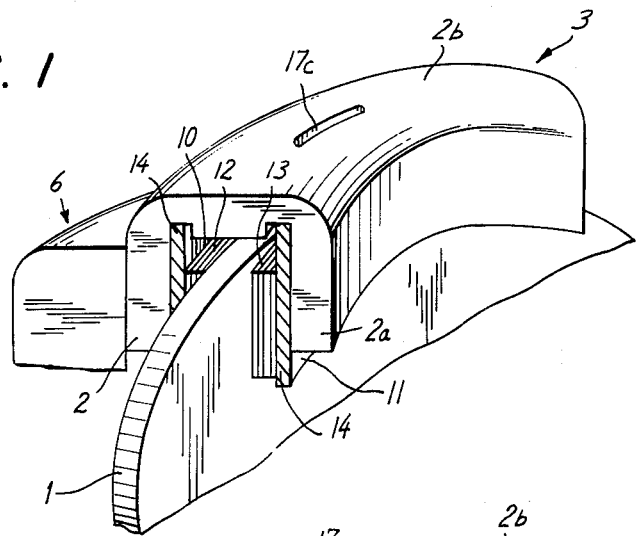
FIG. 1 is a schematic fragmentary partly sectional perspective view of a disk brake which embodies one form of my invention.
Figure 5:
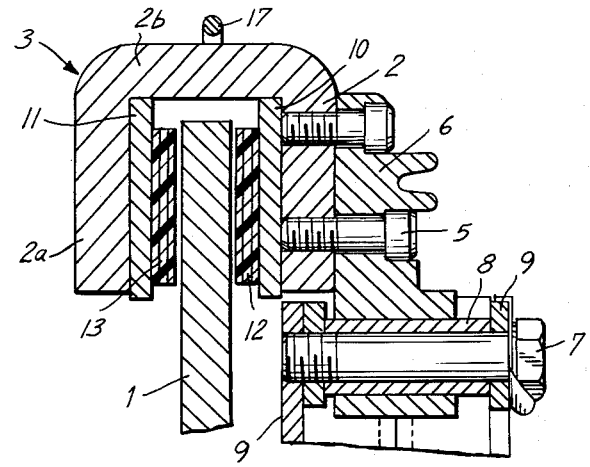
FIG. 5 is a transverse section through a fully assembled disk brake, substantially as seen in the direction of arrows from the line V—V of FIG. 7.
Figure 6:
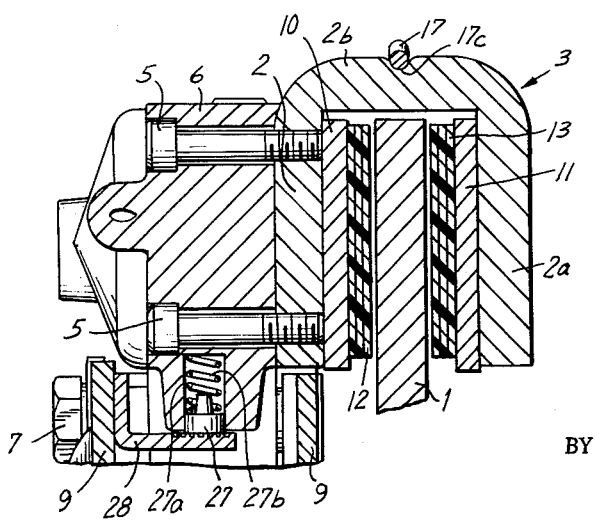
FIG. 6 is another transverse section through the disk brake, substantially as seen in the direction of arrows from the line VI—VI of FIG. 7.
Figure 7:
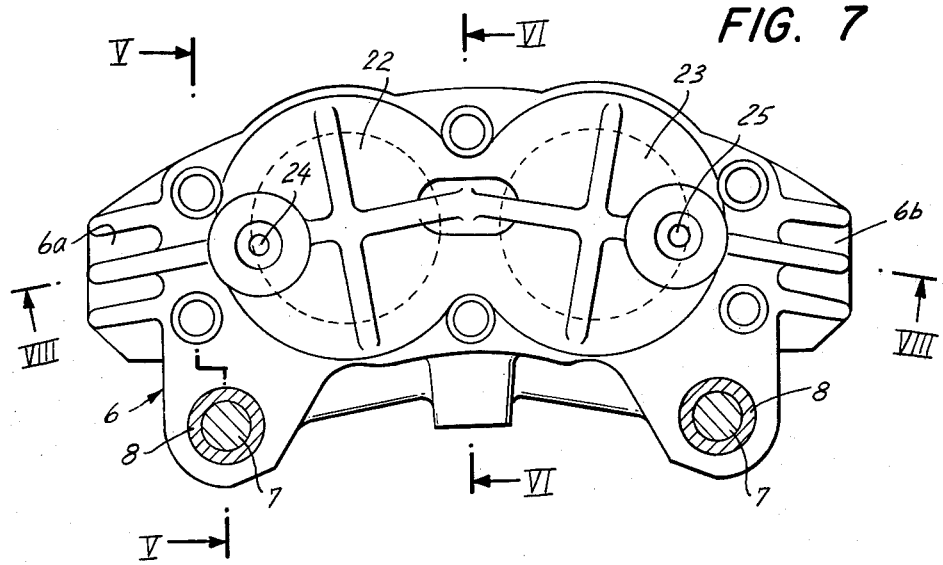
FIG. 7 is a front elevational view of the cylinder housing.

Referring to FIG. 1, there is shown a disk brake including a disk-shaped rotor 1 mounted for rotation at the radially inner portion thereof so as to revolve in a vertical plane together with the wheel of an automotive vehicle or the like. The rotor extends with play into the space between the side walls 2, 2a of an arcuate U-shaped carrier 3, and this carrier further comprises a comparatively thin web 2b constituting an integral connection between the side walls 2, 2a and adjacent to but extending only slightly beyond the periphery of the rotor 1. The carrier 3 consists of cold-pressed metallic material and is secured to a cylinder housing 6 by means of threaded bolts 5 or similar fasteners, see particularly FIGS. 5 and 6. The housing 6 is a light metal casting and comprises two spaced body portions 6a, 6b, best shown in FIG. 8, which take up stresses transmitted by the rotor 1 when the brake is in actual use. A brake holder 9, hereinafter called stator, serves as a fixed support for the cylinder housing 6 which is connected thereto by elongated coupling bolts 7 received in bearing sleeves 8 and serving to allow for limited axial reciprocatory movement of the housing toward and away from one side face of the rotor 1, see FIG. 5. Other types of coupling means may be employed if desired; for example, the coupling means may comprise dovetailed tenons provided on the cylinder housing 6 and reciprocating in complementary grooves of the stator 9, or vice versa. All that counts is to provide suitable coupling means allowing the brake cylinder housing 6 to reciprocate in the axial direction of the rotor 1 so as to move the side walls 2, 2a closer to or farther away from the respective side faces of the rotor. The coupling bolts 7 and sleeves 8, are at least slightly spaced from the carrier 3, and the stator 9 surrounds the hub of the wheel which carries the rotor 1. This stator is connected to the frame structure or to another stationary part of the vehicle.

Figure 3:
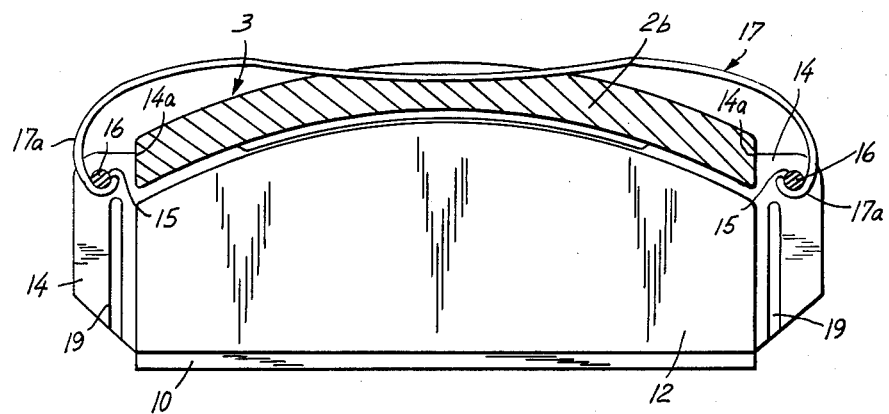
FIG. 3 is a longitudinal section through the carrier, as seen in the direction of arrows from the line III—III in FIG. 4, and shows the manner of suspending and anchoring a brake shoe in the space between the side walls of the carrier.
Figure 4:
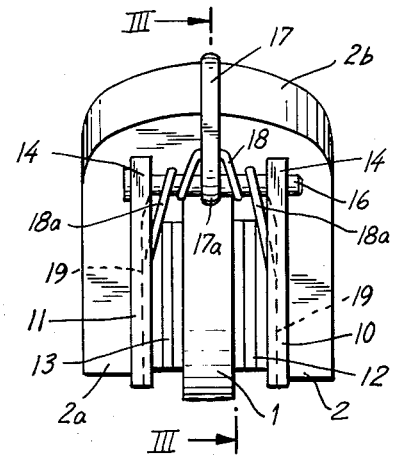
FIG. 4 is an end view of the carrier with two brake shoes, as seen from the right-hand side of FIG. 3.

The carrier 3 supports two detachable brake shoes 10, 11 which are respectively provided with brake lining segments 12, 13. The brake shoe 10 is shown in greater detail in FIG. 3, and it will be noted that it comprises two plate-like extensions 14 each of which is adjacent to one end face of the carrier 3. Each extension 14 is provided with a shoulder 14a which abuts against the respective end face of the web 2b to prevent longitudinal (tangential) displacement of the brake shoe but to allow the brake shoe to move in the axial direction of the rotor 1. The means for detachably securing the brake shoes 10, 11 in the space between the side walls 2, 2a comprises two pins 16 extending through holes 15 provided in the aligned extensions 14 and adjacent to but slightly spaced from the periphery of the rotor 1, and an arcuate securing member 17 of springy material which is adjacent to the outer side of the web 2b and comprises two hooked end portions 17a to engage the pins 16. Each pin 16 is fixed to one extension 14 of the brake shoe 11 but is slidable in the aligned extension of the brake shoe 10, or vice versa, so that the lining segments 12, 13 may move axially toward or away from the respective side faces of the rotor 1. The securing member 17 holds the brake shoes 10, 11 against radial movement with reference to the rotor and a portion thereof extends into a groove 17c provided in the outer side of the web 2b.

The means for biasing the lining segments 12, 13 away from the side faces of the rotor comprises two torsion springs 18 of spring steel which are convoluted around the pins 16 and which comprise outwardly extending fingers 18a slidable in grooves or channels 19 provided in the inner sides of the respective extensions 14. Thus, each brake shoe is normally biased in a direction away from the rotor 1 and is held in abutment with the inner side of the respective side wall. The bias of the springs 18 is comparatively weak but suffices to prevent unnecessary wear on the lining segments. The depth of each channel 19 exceeds at least slightly the diameter of a finger 18a to make sure that the springs 18 remain out of contact with the rotor 1 even if the material of the lining segments 12, 13 happens to wear away so that the rotor comes in direct contact with the brake shoes. Such configuration of the channels 19 prevents unpleasant noises when the brake is in actual use. The manner in which the lining segments are bonded to the brake shoes is known and forms no part of my invention. It suffices if the brake shoe 10 is free to move with reference to the carrier 3 in the axial direction of the rotor 1, i.e., the brake shoe 11 may be rigidly fixed to the side wall 2a.

Figure 2:
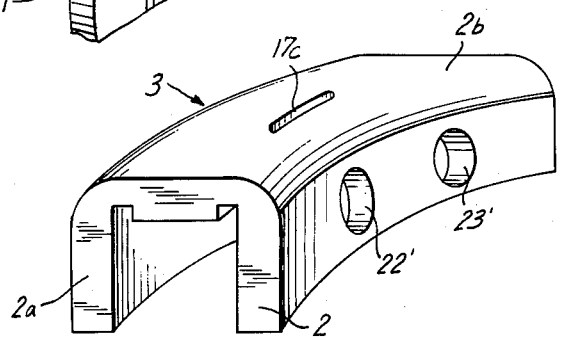
FIG. 2 is a perspective view of a channel-shaped carrier which is utilized in the disk brake of FIG. 1.
Figure 8:
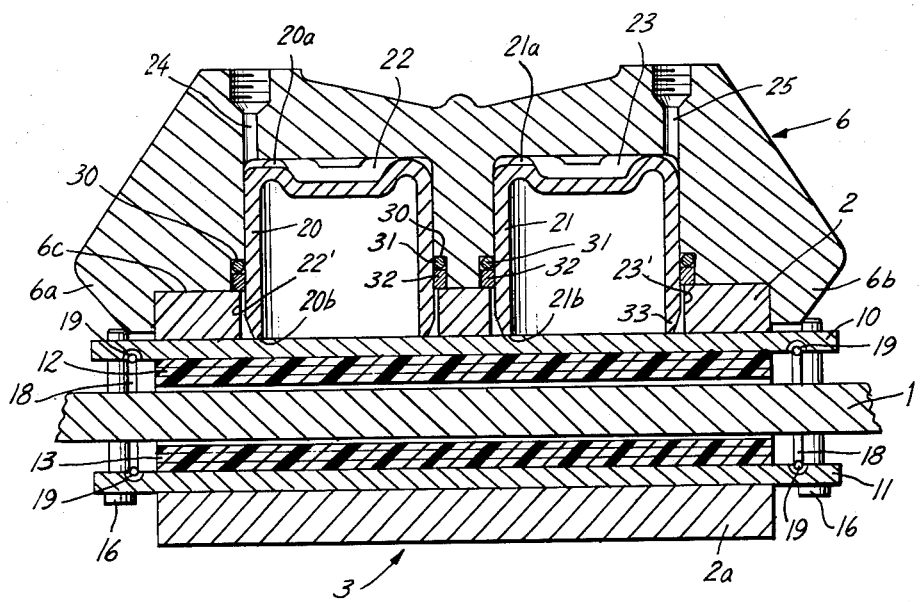
FIG. 8 is a longitudinal section through the disk brake, substantially as seen in the direction of arrows from the line VIII—VIII of FIG. 7.

The brake cylinder housing 6 defines two symmetrically arranged cylinder chambers 22, 23, see FIG. 8 which are parallel with the axis of the rotor and which register with cylindrical holes 22', 23' provided in the side wall 2 of the carrier 3 (see also FIG. 2). Ports 24, 25 serve to admit a hydraulic fluid from a master cylinder or another suitable source, not shown, in order to displace two hollow cup-shaped pistons 20, 21 which consist of deep-drawn metallic material. When the ports 24, 25 admit oil or another hydraulic fluid, the pistons 20, 21 press against the shoe 10 and move the lining segment 12 against one side face of the rotor 1. At the same time, the fluid entering the chambers 22, 23 forces the cylinder housing 6 to slide along the bolts 7 and to press the lining segment 13 against the other side face of the rotor so that the segments transmit a braking force which is proportional to the fluid pressure and to the area of lining segments 12, 13. Suitable protuberances 20a, 21a on the bottom walls of the pistons provide a path for entry of fluid from the ports 24, 25 into the cylinders 22, 23. When the brake is idle, the annular front end faces 20b, 21b of the pistons remain coplanar with the inner side of the side wall 2 because the springs 18 hold the outer side of the shoe 10 in abutment with the side wall 2. It will be noted that the pistons 20, 21 respectively extend into the holes 22', 23' in the side wall 2.

When the brake is applied and the pistons 20, 21 extend beyond the inner side of the wall 2 to press the lining segment 12 against the rotor 1, a current of air flows through a narrow gap between the outer side of the brake shoe 10 and the inner side of the side wall 2 to cool the brake and to prevent excessive heating of the cylinder housing. Also, the front end portions of the pistons 20, 21 are then fully exposed to and exchange heat with such currents of air to make sure that the heating of cylinder housing 6 remains within permissible limits. The quantity of heat which is actually transmitted to the housing 6 through the walls of cylinders 20, 21 is negligible because the area the end faces 20b, 21b is very small. It is preferred to place the carrier 3 next to the uppermost portion of the rotor 1 so that the gap between the side wall 2 and brake shoe 10 (when the brake is applied) is substantially parallel with the direction of forward movement of the vehicle and currents of cooling air may flow through this gap to exchange heat with the parts 2, 10, 20 and 21. The length of the carrier 3, as seen in the circumferential direction of the rotor 1, is rather small to make sure that the currents of cooling air undergo little deflection and may withdraw large quantities of air when the brake is in actual use. As a rule, the length of the carrier is less than 90 degrees.

It is often desirable to prevent uncontrolled reciprocatory movements of the cylinder housing 6 with reference to the stator 9. The means for obstructing such movements comprises a pressure transmitting head 27 provided in a radially extending bore 27a of the housing 6 and biased by a helical spring 27b to bear against a knurled, ribbed or otherwise roughened surface of a bracket 28 secured to the stator 9. Of course, the bias of the spring 27b is too weak to prevent axial movement of the cylinder housing 6 when the chambers 22, 23 receive a supply of pressure fluid.

It will be noted that the axes of the coupling bolts 7 are disposed on the peripheries of two circles which are concentric with the rotor 1 and which intersect the cylinder chambers 22, 23.

It is well known that the efficiency of a disk brake depends primarily on the magnitude of braking force which is applied to the rotor and on the area of the rotor surface to which the braking force is applied, namely, on the magnitude of the rotor surface area which comes in direct engagement with the brake shoes. Thus, if the braking effect is to remain the same, any reduction in the magnitude of braking force must be accompanied by proportional increases in the area of contact between the rotor and the brake shoes. However, the total area of such contact cannot be increased at will because, if the brake shoes conceal a large part of the rotor, the rotor and the brake shoes cannot dissipate sufficient heat energy by heat exchange with currents of cooling air. Therefore, it is very important to utilize a comparatively large rotor, i.e., the diameter of the rotor 1 should be as large as is permissible in view of the dimensions of the wheel on which the rotor is mounted and, for the same reason, it is equally important to construct the remainder of the disk brake in such a way that its parts extend very little beyond the periphery of the rotor. As stated before, proper cooling of the brake can be effected very satisfactorily if 80–90 percent of total rotor surface area remains exposed to currents of cooling air and if the carrier 3 is adjacent to the uppermost point of the rotor 1 so that the wind need not undergo any deflection while flowing through the gap between the side wall 2 and the brake shoe 10 when the brake is applied to move the lining segments in frictional engagement with the side faces of the rotor.

The importance of proper cooling of the rotor 1 and pistons 20, 21 will be more readily understood by considering that the rotor is often heated to a very high temperature at which its material begins to glow, especially if the brake is applied at frequent intervals or for longer periods of time while the vehicle is in motion. In the absence of satisfactory cooling, heat conveyed to the cylinder housing 6 is apt to cause evaporation of hydraulic fluid. The likelihood of such evaporation is very remote if the pistons 20, 21 are constructed in a manner as shown in FIG. 8, namely, that each thereof contacts the brake shoe 10 with a small annular end face (20b, 21b) and if each thereof resembles a thin-walled cup so that little heat energy is conveyed to the housing 6. Furthermore, and as explained above, currents of cooling air sweeping the exposed front end portions of the pistons when the brake is in actual use will effectively cool the pistons to further reduce the likelihood of overheating the hydraulic fluid. Also, the brake shoe 10 is then moved away from the side wall 2 which is secured to the housing 6 so that this housing can be heated solely by the pistons 20, 21 and through the web 2b and side wall 2a both of which are fully exposed to the wind.

Another very important requirement which is met by the disk brake of my invention is that the carrier 3 is capable of taking up very large stresses which tend to move the brake shoes 10, 11 tangentially of the rotor 1 when the vehicle is in motion and when the operator applies the brakes. Such stresses are resisted by the extensions 14 which abut against the respective end faces of the carrier, by the fasteners 5 which couple the carrier to spaced body portions 6a, 6b of the brake cylinder housing 6, by the coupling members 7, 8 which connect the housing 6 to the stator 9 for reciprocatory movement in the axial direction of the rotor, and by the stator 9 whose parts are fixedly secured to the frame structure of the vehicle.

Referring again to FIG. 8, it will be noted that the body portions 6a, 6b of the brake cylinder housing 6 overlie the end faces of the side wall 2 to prevent any tangential displacements of the carrier 3 with reference to the rotor. The inner side face 6c of the housing 6 is provided with two annular recesses 30 which surround the pistons 20, 21 and each of which receives a two-piece annular gasket including a first ring 31 of elastically deformable material and a metallic ring 32 which is loosely received in the recess 30 adjacent to the side face 6c and serves to maintain the respective ring 31 in deformed condition. Thus, each ring 31 bears against the smooth external surface of the respective piston and prevents leakage of hydraulic pressure medium from the respective cylinder chamber.

In order to further reduce the likelihood of overheating the cylinder housing 6, the annular front end portions 33 of the pistons 20, 21 diminish in wall thickness in a direction toward the end faces 20b, 21b so that the combined area of these end faces is very small. The pistons consist of deep-drawn sheet steel or the like.

Axial displacements of the pistons 20, 21 are rather small and the rings 31 actually tend to move these pistons away from the brake shoe 10 when the brake is in actual use. In other words, the rings 31 assist the springs 18 in returning the end faces 20b, 21b into the plane of the side face 6c as soon as the pressure of fluid in cylinder chambers 22, 23 begins to decrease.

The provision of two-piece gaskets in the recesses 30 of the side face 6c contributes to substantial simplification of the disk brake and allows for utilization of thin-walled pistons which convey little heat to the cylinder housing. Thus, it would be impossible to utilize a very thin-walled piston if the ring 31 were recessed in the peripheral surface of the piston rather than in the material of the housing.

Figure 9:
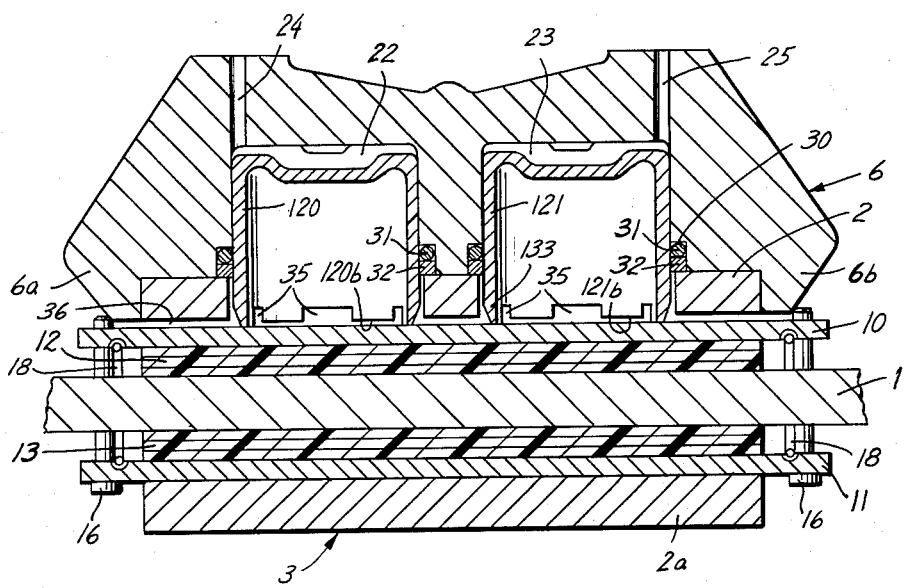
FIG. 9 is a longitudinal section through a modified disk brake.

FIG. 9 illustrates a slightly modified disk brake which is shown in operative position whereby the end faces 120b, 121b of two modified pistons, 120, 121 press the lining segment 12 of the brake shoe 10 against one side face of the rotor 1. The gap 36 between the inner side of the side wall 2 and the outer side of the brake shoe 10 admits currents of cooling air which flow tangentially of the rotor and cool the hollow conical front end portions 133 of the pistons 120, 121.

In order to further reduce heat exchange between the brake shoe 10 and cylinder housing 6, the pistons 120, 121 are provided with cutouts or slots 35 extending inwardly from the end faces 120b, 121b so that the combined area of these end faces is even smaller than that of the end faces 20b, 21b.

Otherwise, the construction of this disk brake is identical with that of the disk brake described in connection with FIGS. 1 to 8. In the embodiment of FIG. 9, each of the pistons 120, 121 is formed with six cutouts or slots 35 whose width is such that the area of the end face 120b or 121b does not exceed one-half of the area of the end face 20b or 21b. Another very important advantage of the cutouts or slots 35 is that they allow streams of cooling air which flow in the gap 36 to enter the interior of the pistons 120, 121 so that such air cools the entire internal surface of each piston. If desired, the slots 35 may be replaced by holes or similar cutouts which are immediately adjacent to the end faces 120b, 121b and which admit air into the pistons when the brake is applied, i.e., when the front end portions 133 of the pistons extend across the gap 36. Such pistons are equally useful in certain conventional disk brakes in which each brake shoe is movable by one or more pistons.

Of course, as the thickness of the brake lining segments 12, 13 decreases in response to wear on repeated frictional engagement with the rotor 1, the width of the gap 36 increases to admit larger quantities of air in cooling contact with the front end portions 133 of the pistons 120, 121.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a disk brake, in combination, a channel-shaped carrier comprising a pair of spaced side walls and a web integral with and bridging the space between said side walls, said carrier having a pair of spaced end faces; a pair of brake shoes received intermediate said side walls and each comprising two extensions abutting against said end faces to prevent longitudinal movement of said brake shoes with reference to said carrier, each of said brake shoes further having a lining segment consisting of friction generating material and disposed between said brake shoes and each extension of one of said brake shoes being aligned with one extension of the other brake shoe and each having a hole in registry with the hole of the aligned extension; a pin extending through each pair of registering holes to permit movement of at least one of said brake shoes toward and away from the respective side wall; a torsion spring convoluted on each of said pins and each thereof comprising a pair of outwardly extending fingers engaging said brake shoes to bias the same away from each other; and an elongated securing member of springy material, said securing member being outwardly adjacent to said web and comprising two hooked end portions each of which engages one of said pins to retain said brake shoes between said side walls.

2. In a disk brake, in combination, a channel shaped carrier comprising a pair of spaced side walls and a web integral with and bridging the space between said side walls, said carrier having a pair of spaced end faces; a pair of brake shoes received intermediate said side walls and each comprising two extensions adjacent said end faces and each extension of one of said brake shoes being aligned with one extension of the other brake shoe and each having a hole in registry with the hole of the aligned extension; a pin extending through each pair of registering holes to permit movement of at least one of said brake shoes toward and away from the respective side wall; and an elongated securing member of springy material, said securing member being outwardly adjacent to said web and comprising two hooked end portions each of which engages one of said pins to retain said brake shoes between said side walls.

3. In a disk brake, in combination, a channel shaped carrier comprising a pair of spaced side walls and a web integral with and bridging the space between said side walls, said carrier having a pair of spaced end faces; a pair of brake shoes received intermediate said side walls and each comprising two extensions adjacent said end faces and each extension of one of said brake shoes being aligned with one extension of the other brake shoe; a pair of support means each supporting two aligned extensions so as to permit movement of at least one of said brake shoes toward and away from the respective side wall; and an elongated securing member of springy material, said securing member being located outwardly adjacent to said web and comprising two engaging portions each of which engages one of said support means to retain said brake shoes between said side walls.

References Cited by the Examiner

UNITED STATES PATENTS

| 2,351,041 | 6/1944 | Hawley | 188—73 X |
| 2,918,990 | 12/1959 | Davis | 188—73 |
| 2,921,651 | 1/1960 | Myers | 188—73 |
| 2,966,964 | 1/1961 | Brueder | 188—152 X |
| 2,968,370 | 1/1961 | Ruet | 188—73 |
| 2,987,142 | 6/1961 | Gracie | 188—73 X |
| 3,081,843 | 3/1963 | Dotto et al. | 188—73 |

FOREIGN PATENTS

| 1,101,244 | 4/1955 | France. |
| 1,267,299 | 6/1961 | France. |
| 1,347,011 | 11/1963 | France. |
| 785,367 | 10/1957 | Great Britain. |
| 806,919 | 1/1959 | Great Britain. |

MILTON BUCHLER, *Primary Examiner.*

ARTHUR L. LA POINT, *Examiner.*

G. E. A. HALVOSA, *Assistant Examiner.*